United States Patent Office 3,447,935
Patented June 3, 1969

3,447,935
FLUID POLISHING COMPOSITION AND METHOD OF MAKING
Lawrence L. Marley, 3150 Lewis Ave.,
Fresno, Calif. 93702
No Drawing. Continuation-in-part of application Ser. No. 418,292, Dec. 14, 1964. This application Dec. 21, 1967, Ser. No. 692,308
Int. Cl. C09g 1/10, 1/02
U.S. Cl. 106—8     1 Claim

ABSTRACT OF THE DISCLOSURE

A fluid polishing composition containing a mixture of a wax classed as a hard wax and a wax classed as a soft wax, hydrocarbon solvent, triethanolamine, oleic acid, ammonia water and a finely ground abrasive material providing a lattice carrier for the ammonia water to permit accelerated evaporation and removal of the ammonia water and abrasive material from a surface of application so as to leave the surface in optimum condition for receiving the wax constituents of the composition.

CROSS REFERENCE TO RELATED APPLICATION

This application is a continuation-in-part of application Ser. No. 418,292, filed Dec. 14, 1964, entitled, "Fluid Polishing Composition and Method of Making," now abandoned. Contemporary methods of polishing relative inert hard materials, particularly chromium and stainless steel, normally consist of an abrasive scouring powder, which is used either independently of, or concurrently with, a pad of fine steel wool. While such methods are effective to remove surface discolorations, they require the additional steps of removing the cleansing agent and drying the polished surface to prevent further discoloration by water spotting. A noticeable lack of protective coating is an inherent characteristic of these methods.

Accordingly, it is an object of the present invention to provide a composition which is quite effective in removing surface discolorations of such materials, achieves a polished effect of the surface, and provides a protective wax coating for the cleaned surface.

Certain commercially available fluid wax compositions are available to apply to metal surfaces which have been polished previously, such as chromium and stainless steel, however, many of these compositions include a hydrocarbon solvent which forms a sticky deposit on the waxed surface. The deposit is formed after evaporation of the solvent subsequent to application to a surface. This sticky deposit is detrimental to an ease of manual buffing and polishing, and also prevents the formation of a uniform glossy finish desired by users of fluid wax compositions. In addition, certain hydrocarbon solvents form an oily film during and subsequent to evaporation. Such an oily film is quite objectionable since it provides a surface which readily gathers dust and minute particles of foreign matter. Consequently, on exposure to solar radiation and continued oxidation, the surface coating of wax applied by such compositions frequently deteriorates and a dull surface appearance results.

Accordingly, another object of the invention is to provide a fluid polishing composition which contains a waxing agent which affords a glossy, hard-finished, polished appearance for a surface to which it is applied.

Another object is to provide a method of producing such a wax and polishing composition of economical materials, including a finely ground mechanically abrasive agent.

Another object is to provide a fluid wax and polishing composition which precludes the formation of an oily film on surfaces to which the composition is applied.

Another object is to provide a fluid wax and polishing composition ideally suited for use on chromium and stainless steel metals.

A further object is to provide a method of producing such a fluid wax and polishing composition to satisfy the above objects and yield an emulsion of relatively low volatility and possessing homogeneous characteristics so that violent agitation of the composition is unnecessary prior to use.

These, together with other objects and advantages, will subsequently become more fully apparent upon reference to the following description.

The present invention provides a composition which includes an intimate mixture of selected waxes, solvents, a suitable vehicle, and a finely ground abrading agent. One of the waxes is a "hard" wax to provide a durable wax film, while the other is a softer, more plastic wax to enhance the fluidity and spreading characteristics of the composition. A satisfactory formula of the composition includes a vegetable wax as the hard wax and a mineral wax as the more plastic of the two. As listed below in specific examples of the composition, a carnauba wax has been found to be an ideal hard wax, since it has a melting point within a range of about 83° C. to 88° C. To provide suitable plasticity, a soft mineral wax, such as a paraffin wax, is incorporated in the composition since such a wax has a melting point usually below 65° C.

Since the composition is intended for use on hard materials, particularly selected metals which are relatively immune to chemical action of commercially available cleaners, a finely ground abrasive agent is dispersed in the composition. While chemical cleansing agents are readily available for metals, such as copper and silver, and alloys thereof, no commercially available chemical cleansing agent is available for use on metals, such as chromium, stainless steel or aluminum. While some commercial preparations are available for use in limited application with stainless steel and aluminum, they normally require consistent usage to be effective. Also, none of the presently available commercial preparations provides a protective wax coating for the mechanically cleansed and polished surface.

To maintain the selected waxes in a liquid or fluid condition, so as to facilitate spreading during use, a suitable solvent is included in the composition. A satisfactory solvent must be of relatively low volatility to permit polishing operations to continue through a reasonable period of time, as well as being selected to prevent the formation of an oily film following evaporation.

Many liquid wax compositions use an oily hydrocarbon solvent, such as kerosene and light mineral oils, as well as various members of the terpene family, commonly known as turpentine. Certain turpentines, such as gum spirits of turpentine, also have been known to form oily residues on the surface to which the compositon has been applied. Accordingly, the most satisfactory hydrocarbon solvents employed in the present invention is a mixture of steamed distilled turpentine and mineral spirits, such as Stoddard solvent.

To enhance the spreadability of the composition, a suitable plasticizer is incorporated in the polishing composition. Oleic acid has been found highly satisfactory for this purpose and is quite compatible with the hydrocarbon solvents used as the vehicle and solvent for the mixture of the waxes.

Since the composition must also serve as a cleansing and polishing agent during application to a surface, a low-cost cleansing vehicle such as ammonium hydroxide in the form of ammonia water is incorporated for the softened wax dissolved in the hydrocarbon solvent. Such a vehicle must also be compatible with the wax solution, as well as control the volatility and enhance the homogeneity. When mixed with the wax solution it forms an emulsion which is substantially homogeneous, even under extended shelf-life conditions, and requires no mechanical agitation prior to using.

To aid in forming such an emulsion, triethanolamine is pre-mixed with the water as an emulsifying agent. In addition, it is imperative that the composition remain substantially homogeneous. Since an abrasive agent is added to the composition, it is desirable to maintain such an agent uniformly dispersed throughout the composition. A specific example of a suitable abrasive agent is a finely ground material, such as silica flour. This material is capable of mechanically abrading the hard surface of chromium and stainless steel, as well as other metal, such as aluminum, to expose a clean surface to the wax contained in the composition. Also, the minute particle size insures suspension of the silica flour in uniform dispersion in the composition to form a lattice structure which serves as a carrier for the ammonia water to permit accelerated evaporation and removal of the ammonia water and abrasive material from a surface of application.

The fluid wax and polishing composition of the present invention contemplates a reasonable range of constituent materials. To illustrate a satisfactory formulation, Example I of a composition prepared in accordance with the invention is as follows.

Example I

| Constituents: | Percent by wt. |
|---|---|
| Carnauba and paraffin wax | 4–6 |
| Hydrocarbon solvent | 35–45 |
| Triethanolamine | 2–4 |
| Oleic acid | 2–4 |
| Ammonia water | .5–2 |
| Abrasive material | 15–20 |
| Water | Balance |

As another example, a fluid composition has been prepared in accordance with the formula set forth below as Example II. Such a composition has been discovered to be quite effective in cleaning, polishing, and waxing hard surfaces substantially immune to chemical action, such as chromium and stainless steel.

Example II

| Constituents: | | Volume |
|---|---|---|
| Carnauba wax | fl. oz | 9 |
| Paraffin wax | fl. oz | 27 |
| Turpentine | gals | 3 |
| Oleic acid | fl. oz | 48 |
| Stoddard solvent | fl. oz | 16 |
| Ammonia water (26%) | fl. oz | 24 |
| Triethanolamine | fl. oz | 16 |
| Silica flour | qts | 4.5 |
| Water | gals | 1½ |

METHOD OF PRODUCING

The composition set forth in Example II above is readily produced by first providing an initimate mixture of the carnauba and paraffin waxes. The two waxes are heated to above about 85° C. to accomplish the melting of the carnauba wax, while concurrently mixing the two as by mechanical stirring. The Stoddard solvent and approximately two-thirds of the turpentine are intermixed in a separate container and heated to above about 85° C. prior to adding to the wax mixture. This prevents solidification of the carnauba wax as the solvent is added, and permits a uniform distribution of the waxes throughout the solvents. Preferably, the temperature is maintained above about 85° C. and mechanical agitation is used to effect dissolution of the waxes. Following the formation of the solution of wax and hydrocarbon solvents, the oleic acid is added to provide the desired plasticity.

Approximately one-third of the water to be added as a vehicle is heated in a separate container to a boiling temperature, or at least above 95° C. prior to the addition of the triethanolamine. The above described mixture of waxes, oleic acid, and solvents is removed from the heating zone prior to the addition of the water and emulsifying agent. The mixture of water and triethanolamine is then added to the intermixed waxes and solvents to form a thick emulsion. Mild mechanical agitation, such as stirring, is continued to facilitate dispersal of the wax mixture throughout the aqueous vehicle. The remaining turpentine and a small amount of ammonium hydroxide, in the form of the ammonia water, is mixed with the abrasive agent in the form of the silica flour which mixture is then added to the previously formed emulsion, while continuing mechanical agitation. The balance of the water is separately heated to above about 95° C. and then added to the previously formed emulsion containing the silica flour.

An important step is to continue mixing of the composition, while permitting it to cool to about room temperature, noting an increase in the viscosity of the emulsion. Continued mixing during the cooling process is important to maintain homogeneity of the composition following packaging. This precludes striation and separation of the constituent materials, so that violent mechanical agitation, as by shaking, is unnecessary immediately prior to use of the composition.

Following cooling of the emulsion, it is packaged in hermetically sealed containers, such as conventional metal cans. It has been noted that the composition maintains a substantially homogeneous character even though stored for an extended period of time. Accordingly, the composition is ready for immediate use regardless of the elapsed time between packaging and use.

The composition is applied to a surface to be polished and waxed by using a dry cloth on which the composition is spread. Mild pressure is applied to the polishing cloth, depending upon surface discoloration to be removed. With certain metals, such as stainless steel, surface discolorations acquired over an extended period are sometimes difficult to remove without moderate to heavy pressures. The abrasive substance in the form of the silica flour readily removes such discoloration and results in a polished surface appearance. The wax constituents, being uniformly distributed throughout the composition, are deposited in a thin, but protective, coating on the surface. After a short drying period, the wax coating is lightly buffed to provide a protective layer of hard wax of high gloss characteristics and without the oily film frequently formed in fluid wax compositions. Accordingly, the present invention provides a fluid wax and polishing composition readily prepared from economical and commercially available constituent materials. The resulting composition is easily applied with a minimum of effort to achieve a polish on metals substantially immune to mechanical action and to protect the polished surface with a hard wax coating.

While the instant invention is described in terms of particular ingredients, and ranges thereof, to be used, it is obvious that many modifications and variations in the nature and proportions of the ingredients may be made without departing from the spirit and scope of the invention, and only such limitations should be imposed as are indicated in the appended claims.

Having described my invention, what I claim as new and desire to secure by Letters Patent is:

1. The method of producing a fluid polishing composition comprising the heating to above about 85° C. a carnauba wax with a paraffin wax in relative proportions of one to three; separately heating above about 85° C. a hydrocarbon solvent selected from the group consisting of mineral spirits and turpentines, the quantity of solvent being at about a three to one ratio, by weight, relative to the waxes; mixing the heated solvent with the heated wax mixture while maintaining the temperature above about 85° C.; adding an amount of oleic acid substantially equal to the wax mixture and blending while maintaining the temperature above about 85° C. until a substantially homogeneous mixture is obtained; adding a quantity of triethanolamine to a quantity of water to form an emulsifying mixture, the relative proportions being at about a one to five ratio, by weight, and the quantity of triethanolamine being about equal to the quantity of carnauba wax used in said wax mixture; heating the mixture of water and triethanolamine to above about 95° C.; discontinuing the heating of the solvent, oleic acid, and the wax mixture while concurrently adding the emulsifying mixture of triethanolamine and water; heating separately a mixture of ammonia water in a concentrated form so that the ammonium hydroxide concentration is about 25% of the total mixture and a quantity of hydrocarbon solvent so that the total quantity of solvent is at about a five to one ratio, by weight, relative to the wax mixture; maintaining the temperature of the ammonia water and solvent at a temperature above about 150° C.; dispersing a finely ground abrasive material uniformly throughout the mixture to provide a lattice carrier for the ammonia water to permit accelerated evaporation and removal of the ammonia water and abrasive material from a surface of application; adding the mixture of said ammonia water, turpentine and abrasive material to the wax, solvent, and triethanolamine mixture; adding an additional quantity of water heated to above about 95° C., the additional quantity being at about the ratio of two to one when compared to the initial quantity of water; and permitting the resulting emulsion to cool to room temperature while continuously mechanically mixing the emulsion.

References Cited

UNITED STATES PATENTS

| | | | |
|---|---|---|---|
| 2,295,132 | 9/1942 | Sharp et al. | 106—10 XR |
| 2,726,961 | 12/1955 | Iler | 106—10 |
| 2,836,499 | 5/1958 | Lyons | 106—271 XR |
| 2,839,482 | 6/1958 | Geen et al. | 106—10 XR |
| 2,907,664 | 10/1959 | Schoenholz et al. | 106—10 |
| 2,956,888 | 10/1960 | Gunning | 106—10 |
| 2,993,800 | 7/1961 | Pickell | 106—271 |

OTHER REFERENCES

Bennett, Industrial Waxes, New York, Chemical Publishing Co., Inc., vol. II, 1963, pp. 136–7 ("Methods of Emulsification").

DONALD J. ARNOLD, *Primary Examiner.*

JOAN B. EVANS, *Assistant Examiner.*

U.S. Cl. X.R.

106—271, 10, 11, 285; 252—311